(12) United States Patent  
Ashida

(10) Patent No.: US 9,071,504 B2  
(45) Date of Patent: Jun. 30, 2015

(54) DATA PROCESSING APPARATUS AND METHOD OF CONTROLLING THE SAME

(75) Inventor: Jumpei Ashida, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 12/968,694

(22) Filed: Dec. 15, 2010

(65) Prior Publication Data

US 2011/0149985 A1 Jun. 23, 2011

(30) Foreign Application Priority Data

Dec. 22, 2009 (JP) ................................ 2009-291398
Nov. 26, 2010 (JP) ................................ 2010-264296

(51) Int. Cl.
*H04L 12/28* (2006.01)
*H04L 12/751* (2013.01)
*H04L 12/741* (2013.01)

(52) U.S. Cl.
CPC ................ *H04L 45/02* (2013.01); *H04L 45/54* (2013.01)

(58) Field of Classification Search
USPC ....................................................... 370/401
See application file for complete search history.

(56) References Cited

U.S. PATENT DOCUMENTS

| | | | |
|---|---|---|---|
| 5,530,809 A * | 6/1996 | Douglas et al. ............... | 709/250 |
| 6,285,687 B1 * | 9/2001 | Lovelace et al. .............. | 370/509 |
| 6,570,872 B1 * | 5/2003 | Beshai et al. ................. | 370/369 |
| 7,266,122 B1 * | 9/2007 | Hogg et al. .............. | 370/395.41 |
| 7,277,643 B2 * | 10/2007 | Baba et al. ..................... | 398/155 |
| 7,292,784 B2 * | 11/2007 | Lee et al. .......................... | 398/49 |
| 7,346,072 B2 * | 3/2008 | Jones et al. .................... | 370/461 |
| 7,443,868 B2 * | 10/2008 | Suzuki et al. ................. | 370/401 |
| 7,567,561 B2 * | 7/2009 | Toumura ....................... | 370/389 |
| 7,583,683 B2 * | 9/2009 | Kim .............................. | 370/401 |
| 7,599,289 B2 * | 10/2009 | Caci .............................. | 370/230 |
| 8,072,893 B2 * | 12/2011 | Dielissen et al. .............. | 370/252 |
| 8,249,067 B2 * | 8/2012 | Budhia et al. ................. | 370/389 |

FOREIGN PATENT DOCUMENTS

JP 2006-180166 A 7/2006

OTHER PUBLICATIONS

Axel Jantsch et al. (eds.), Networks on Chip, Chapter 10: "An IP-Based On-Chip Packet-Switched Network", UK, Kluwer Academic Publishers, 2003, pp. 192-213.
Wolf-Dietrich Weber, "Enabling Reuse via an IP Core-centric Communications Protocol: Open Core Protocol", Sonics, Inc., 2000, pp. 1-4.

* cited by examiner

*Primary Examiner* — Ian N Moore
*Assistant Examiner* — Lakeram Jangbahadur
(74) *Attorney, Agent, or Firm* — Fitzpatrick, Cella, Harper & Scinto

(57) ABSTRACT

Provided is a data communication technique in which overhead is reduced. A data processing apparatus includes a plurality of modules each of which executes data processing; a plurality of routers, which have input ports and output ports, for relaying data transmission among the plurality of modules; and a control unit for outputting a control signal to each of the plurality of routers to thereby control selection of router path. Each of the plurality of routers has a deciding unit for deciding an output port and output timing used in data transmission by utilizing a value of the control signal that has been input thereto.

14 Claims, 18 Drawing Sheets

FIG. 7

| iPort | iSlot | oPort | oSlot |
|---|---|---|---|
| 1 | 1 | 2 | 2 |
|   | 2 | 2 | 3 |
|   | 3 | 2 | 4 |
|   | 4 | — | — |
| 2 | 1 | 1 | 2 |
|   | 2 | 3 | 3 |
|   | 3 | 1 | 4 |
|   | 4 | 3 | 1 |
| 3 | 1 | — | — |
|   | 2 | 3 | 4 |
|   | 3 | — | — |
|   | 4 | 3 | 2 |

FIG. 12

| MODULE | INPUT THROUGHPUT | OUTPUT THROUGHPUT | PROCESSING ORDER |
|---|---|---|---|
| IP CORE 210-2 | 1/6 | 1/6 | 1 |
| IP CORE 210-3 | 1/6 | 1/6 | 3 |
| IP CORE 210-4 | 1/6 | 1/6 | 2 |
| IP CORE 210-5 | 1/6 | 1/6 | 4 |
| IP CORE 210-6 | 1/6 | 1/6 | 5 |
| IP CORE 210-7 | 1/6 | 1/6 | 6 |
| IP CORE 210-8 | 1/6 | 1/4 | 7 |

FIG. 14A (RT1)

| iPort | iSlot | oPort | oSlot |
|---|---|---|---|
| 1 | 1 | 3 | 2 |
| 1 | 2 | 3 | 3 |
| 1 | 3 | 3 | 1 |
| 1 | 4 | – | – |
| 2 | 1 | – | – |
| 2 | 2 | – | – |
| 2 | 3 | – | – |
| 2 | 4 | – | – |
| 3 | 1 | 1 | 3 |
| 3 | 2 | – | – |
| 3 | 3 | 1 | 1 |
| 3 | 4 | – | – |

FIG. 14B (RT2)

| iPort | iSlot | oPort | oSlot |
|---|---|---|---|
| 1 | 1 | 3 | 3 |
| 1 | 2 | – | – |
| 1 | 3 | 3 | 1 |
| 1 | 4 | – | – |
| 2 | 1 | – | – |
| 2 | 2 | – | – |
| 2 | 3 | – | – |
| 2 | 4 | – | – |
| 3 | 1 | 1 | 3 |
| 3 | 2 | – | – |
| 3 | 3 | 1 | 1 |
| 3 | 4 | – | – |

FIG. 14C (RT3)

| iPort | iSlot | oPort | oSlot |
|---|---|---|---|
| 1 | 1 | 1 | 3 |
| 1 | 2 | – | – |
| 1 | 3 | 1 | 1 |
| 1 | 4 | – | – |
| 2 | 1 | 3 | 3 |
| 2 | 2 | – | – |
| 2 | 3 | 3 | 1 |
| 2 | 4 | – | – |
| 3 | 1 | – | – |
| 3 | 2 | 1 | 4 |
| 3 | 3 | – | – |
| 3 | 4 | 1 | 2 |

FIG. 14D (RT4)

| iPort | iSlot | oPort | oSlot |
|---|---|---|---|
| 1 | 1 | 3 | 3 |
| 1 | 2 | 1 | 3 |
| 1 | 3 | 3 | 1 |
| 1 | 4 | 1 | 1 |
| 2 | 1 | – | – |
| 2 | 2 | – | – |
| 2 | 3 | – | – |
| 2 | 4 | – | – |
| 3 | 1 | 2 | 3 |
| 3 | 2 | – | – |
| 3 | 3 | 2 | 1 |
| 3 | 4 | – | – |

FIG. 14E (RT5)

| iPort | iSlot | oPort | oSlot |
|---|---|---|---|
| 1 | 1 | 3 | 3 |
| 1 | 2 | – | – |
| 1 | 3 | 3 | 1 |
| 1 | 4 | – | – |
| 2 | 1 | – | – |
| 2 | 2 | – | – |
| 2 | 3 | – | – |
| 2 | 4 | – | – |
| 3 | 1 | 1 | 2 |
| 3 | 2 | 1 | 3 |
| 3 | 3 | 1 | 1 |
| 3 | 4 | – | – |

DATA PROCESSING APPARATUS AND METHOD OF CONTROLLING THE SAME

BACKGROUND OF THE INVENTION

1. Field of the Invention

The present invention relates to a data processing apparatus and to a method of controlling this apparatus. More particularly, the invention relates to technology for improving data communication efficiency in a data processing apparatus that uses a network-on-chip system.

2. Description of the Related Art

A network-on-a-chip is known as a technique for data communication between IP (Intellectual Property) cores in an SoC (System-on-Chip) (see Axel Jantsch and Hannu Tenhunen, "Networks on Chip", UK, Kluwer Academic Publishers). This is a technique that applies the concept of a computer network to communication between modules inside a chip.

A system using a network-on-chip generally has a plurality of data processing modules (IP cores) and a plurality of routers, and each data processing module receives and delivers data via a router. The data communication path can be set from firmware or the like. This enables the sequence of the data processing modules that process data to be changed dynamically, and this makes it possible to implement a versatile, fast data processing apparatus. Further, since communication is performed via routers, it is unnecessary to all-inclusively connect a data processing module and other data processing modules directly by signal lines. This makes it possible to reduce wiring. Further, since it is easy to add on data processing modules, extensibility is excellent.

Each of the above-mentioned routers has multiple input ports and multiple output ports and delivers an output upon selecting an appropriate output port with regard to data that has been input to each input port. Conventionally, in order to select a data output destination, a router generally refers to information that accompanies communication data that has been received. For example, with the arrangement described in Chapter 10 of "Networks on Chip" and in Wolf-Dietrich Weber, "Enabling Reuse via an IP Core-centric Communications Protocol: Open Core Protocol", Sonics, Inc., address information for identifying a transmission destination is appended to communication data and routing is carried out based upon this address information.

SUMMARY OF THE INVENTION

With the arrangement of the prior art described above, however, the amount of information that must be communicated increases by the amount of information appended to the communication data. This becomes overhead in data communication. Accordingly, the present invention aims to provide a data communication technique in which overhead is reduced.

According to one aspect of the present invention, a data processing apparatus includes:

a plurality of modules each adapted to execute data processing;

a plurality of routers, which have input ports and output ports, adapted to relay data transmission among the plurality of modules; and a control unit adapted to output a control signal to each of the plurality of routers to thereby control selection of router path;

wherein each of the plurality of routers has a deciding unit adapted to determine an output port and output timing used in data transmission by utilizing a value of the control signal that has been input thereto.

According to another aspect of the present invention, a method of controlling a data processing apparatus having a plurality of modules each adapted to execute data processing, and a plurality of routers, which have input ports and output ports, adapted to relay data transmission among the plurality of modules, the method includes:

a control step of a control unit outputting a control signal to each of the plurality of routers to thereby control selection of router path; and a deciding step of the deciding unit deciding an output port and output timing used in data transmission by utilizing a value of the control signal that has been input.

Further features of the present invention will become apparent from the following description of exemplary embodiments (with reference to the attached drawings).

BRIEF DESCRIPTION OF THE DRAWINGS

FIG. 7 is a diagram useful in describing an example of router settings;

FIG. 12 is a diagram useful in describing an example of operation of an image processing apparatus;

FIGS. 14A, 14B, 14C, 14D and 14E are diagrams for describing examples of settings of an image processing apparatus;

DESCRIPTION OF THE EMBODIMENTS

Embodiments of the present invention will be described below in detail with reference to the accompanying drawings. It should be noted that the constituent elements set forth in the embodiments are merely for illustrative purposes and do not constitute gist that limits the scope of the invention to these elements.

(Processing Overview)

Figure 1:
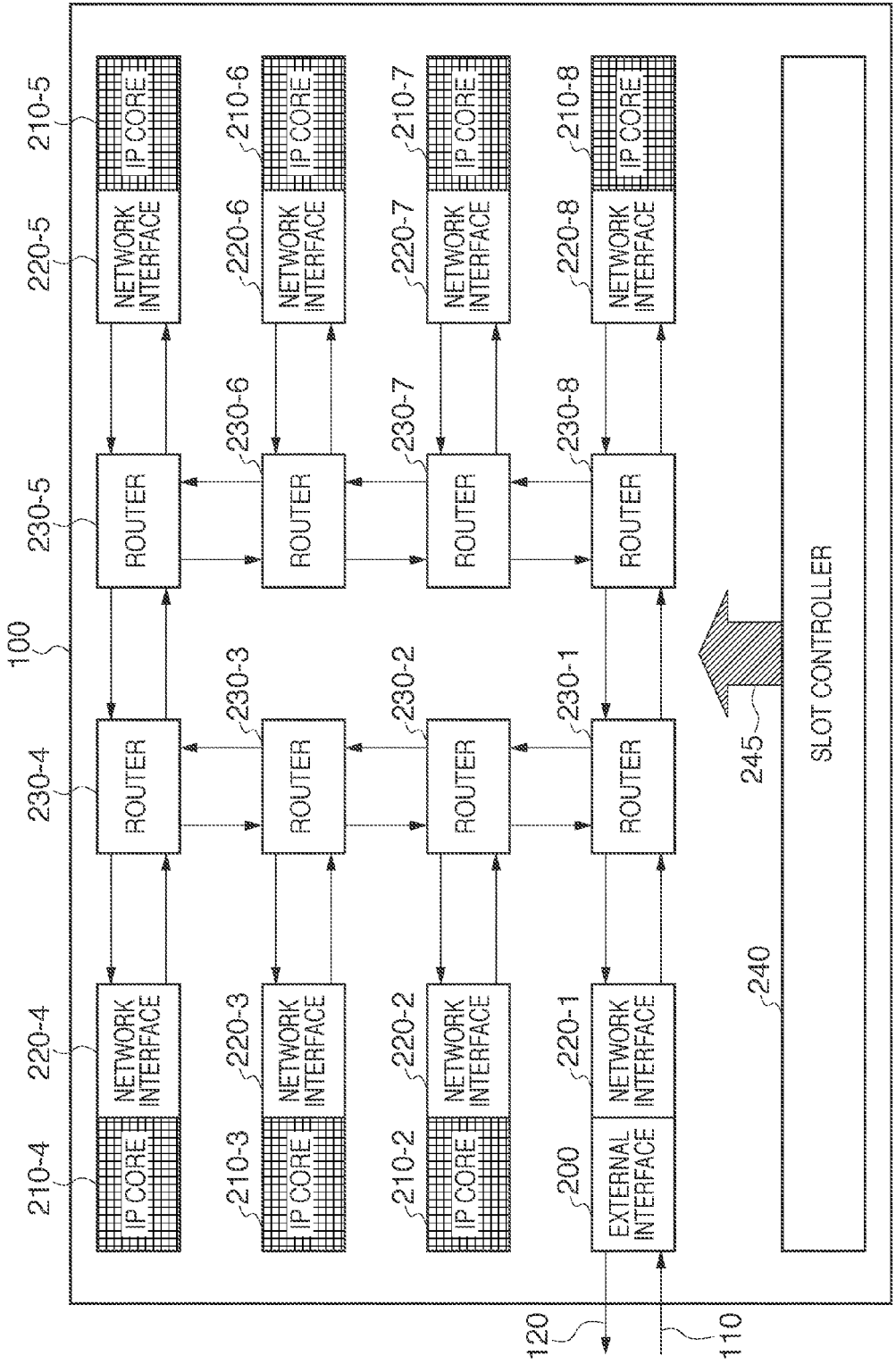
FIG. 1 is a diagram illustrating an example of the configuration of an image processing apparatus.

FIG. 1 illustrates an example of a data processing apparatus 100 in an embodiment of the present invention. In this embodiment, it is assumed that the input to the data processing apparatus 100 is image data. The input image data is subjected to image processing, which conforms to the operating mode, by each of a plurality of IP cores 210, and the apparatus outputs an image that is the result of processing.

The IP cores 210 are, by way of example, a color space conversion module, a filter operation module and a resolution conversion module and the like. The order in which these modules process an image is not unique. It is arranged so that routers 230 route the image data dynamically, thereby allowing the order of processing to be changed in conformity with the operating mode. In addition, it is arranged so that multiple image data sequences, the processing orders of which differ, can be processed simultaneously.

In order to implement such processing, the routers 230 in this embodiment perform routing based upon the timing at which data is received. This timing is controlled by a communication control signal 245 generated by a slot controller 240. This means that it is not necessary to append information such as transmission-destination address, for example, to image data. Accordingly, the full bit width of signal lines connecting the elements can be utilized in the transfer of the image data.

Figure 2:
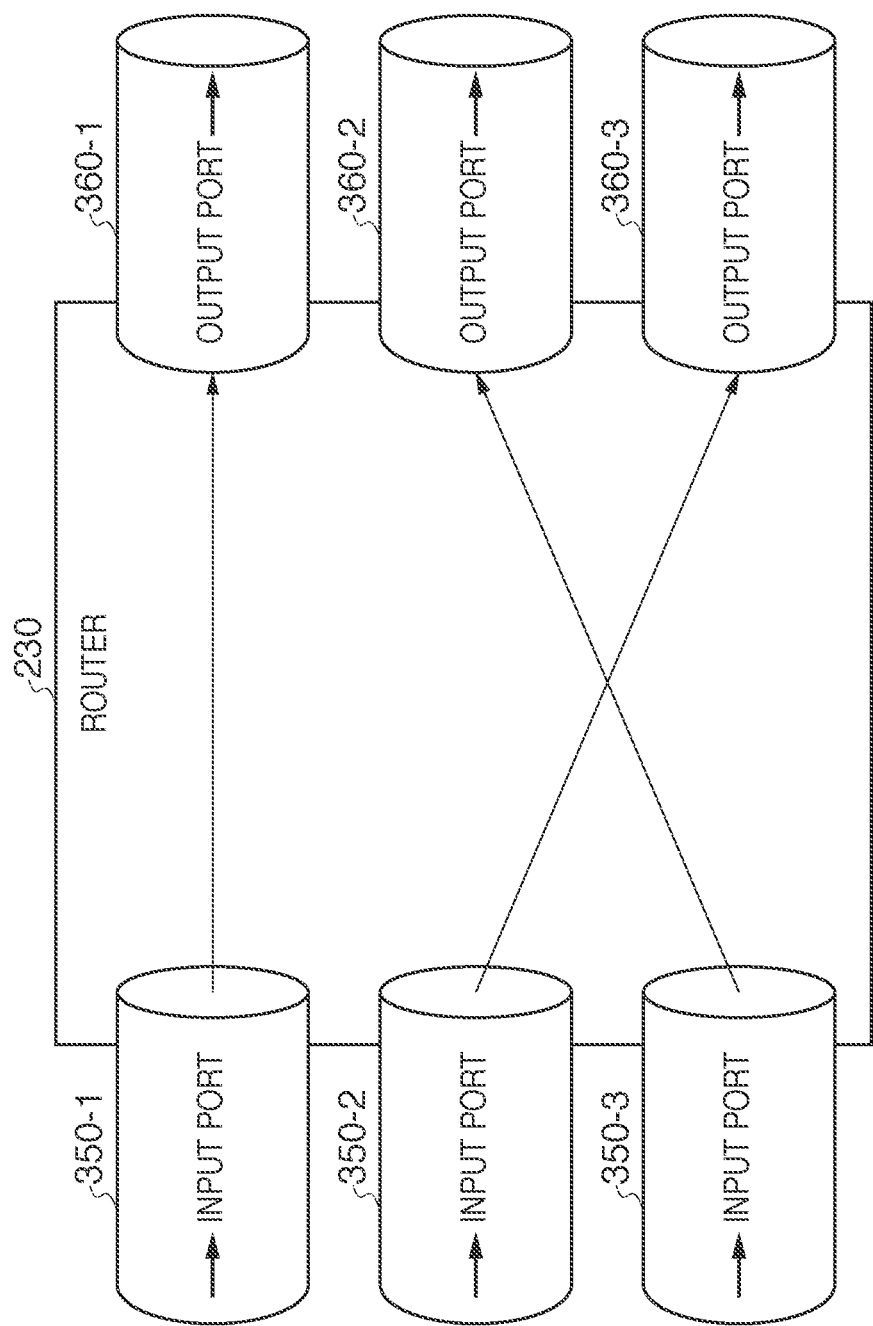
FIG. 2 is a diagram useful in describing operation of a router.

The operating principle for exercising such control will be described. For example, consider a 3-input, 3-output router 230 of the kind shown in FIG. 2. The router 230 has input ports 350 and output ports 360. All data that has been input-from-input port 350-1 is output-to-output port 360-1, all data that has been input-from-input port 350-2 is output-to-output port 360-3, and all data that has been input-from-input port 350-3 is output-to-output port 360-2. In such case, the router 230 can execute processing without problem if there is a table that establishes the correspondence between numbers that identify the input portions and numbers that identify the output ports.

However, when simultaneous processing of multiple image data sequences is considered, it becomes necessary to assign, per item of data, the data that has entered from the input port 350-1 to the output ports 360-1 and 360-2. Selecting an output port per item of data can be achieved by appending additional information, which is for selecting the output port, to the data, and then referring to this additional information, as in the conventional arrangement. In this embodiment, however, information necessary for routing is obtained by endowing data input timing with significance. As a result, data communication overhead can be reduced.

Figure 3:
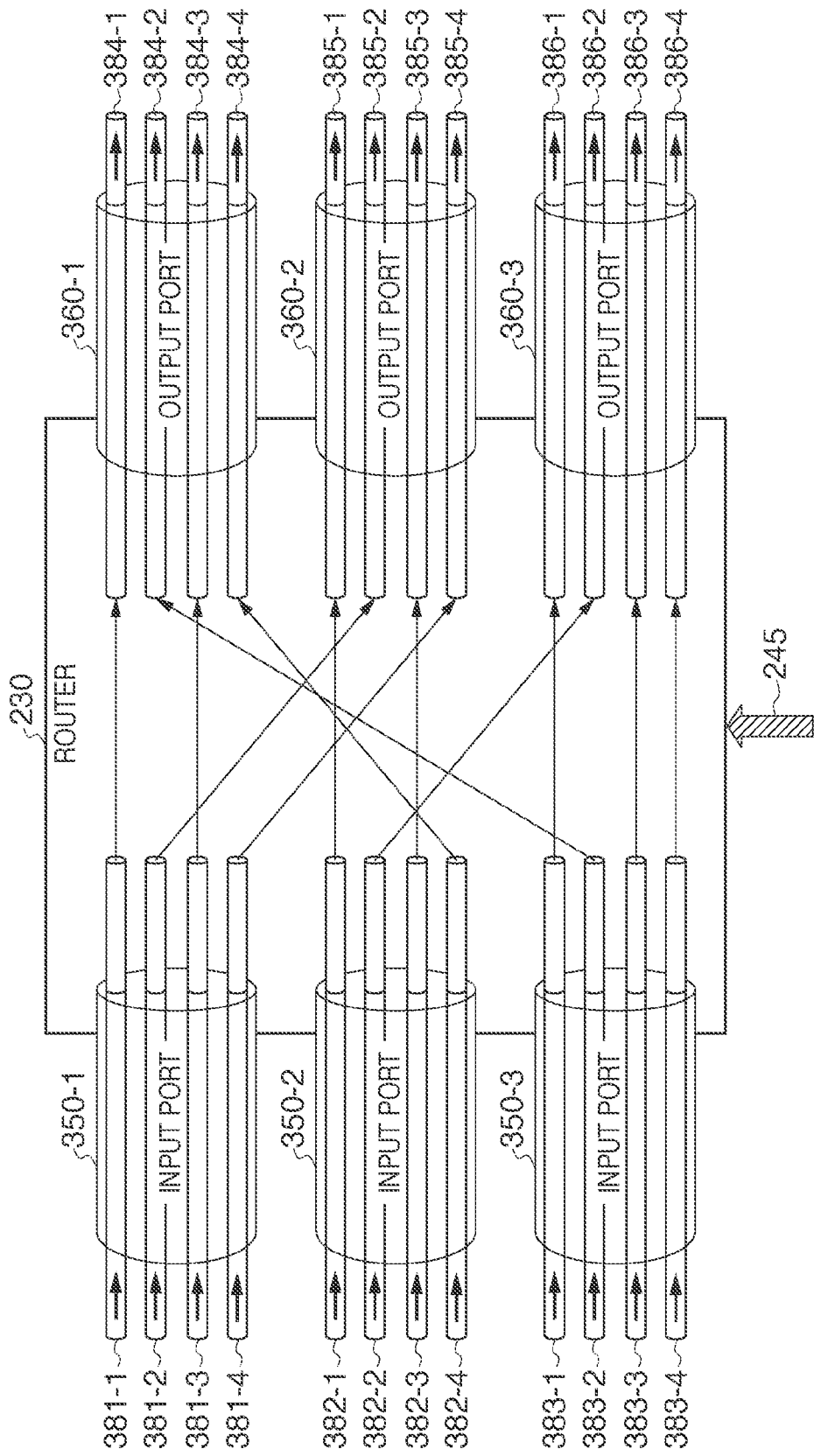
FIG. 3 is a diagram useful in describing an example of mapping of virtual channels.

Here the signal line of each port is divided along the time axis and each signal line is considered a virtual communication channel (referred to simply as a "virtual channel" below). FIG. 3 is a conceptual view of virtual channels in case of division by four. In FIG. 3, reference numerals 381, 382, 383, 384, 385 and 386 denote virtual channels. The communication throughput of each virtual channel is one-fourth that of the original port, by way of example. The communication control signal 245 points out the effective virtual channels in each clock cycle. That is, when the value of communication control signal 245 is "1", for example, virtual channels 381-1, 382-1, 383-1, 384-1, 385-1 and 386-1 are effective. When the value of communication control signal 245 is "2", virtual channels 381-2, 382-2, 383-2, 384-2, 385-2 and 386-2 are effective. When the value of communication control signal 245 is "3", virtual channels 381-3, 382-3, 383-3, 384-3, 385-3 and 386-3 are effective. When the value of communication control signal 245 is "4", virtual channels 381-4, 382-4, 383-4, 384-4, 385-4 and 386-4 are effective. A set of clock cycles thus differentiated by the value of the communication control signal will be referred to as a "slot" below.

Figure 4:
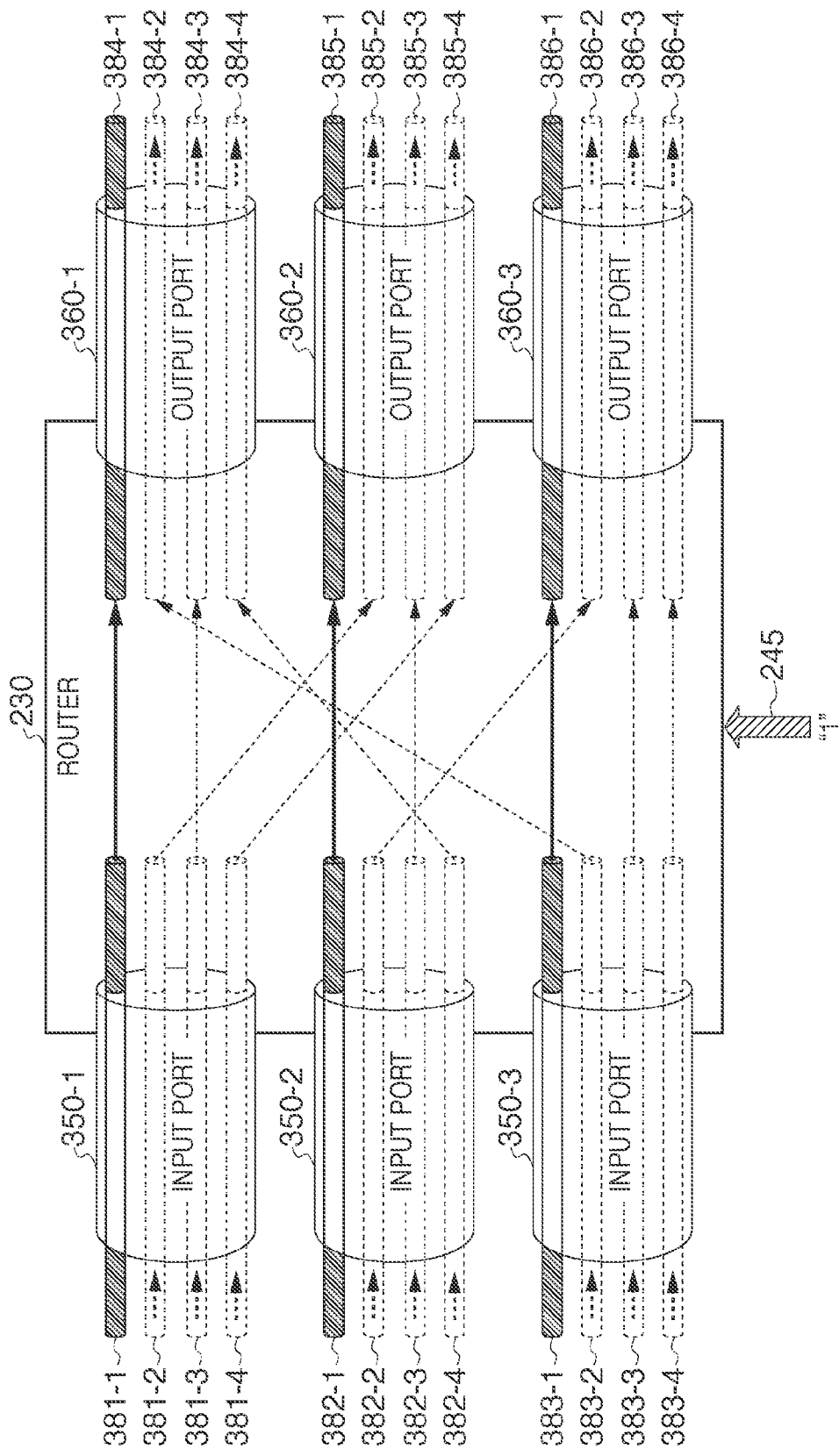
FIG. 4 is a diagram useful in describing router operation.
Figure 5:
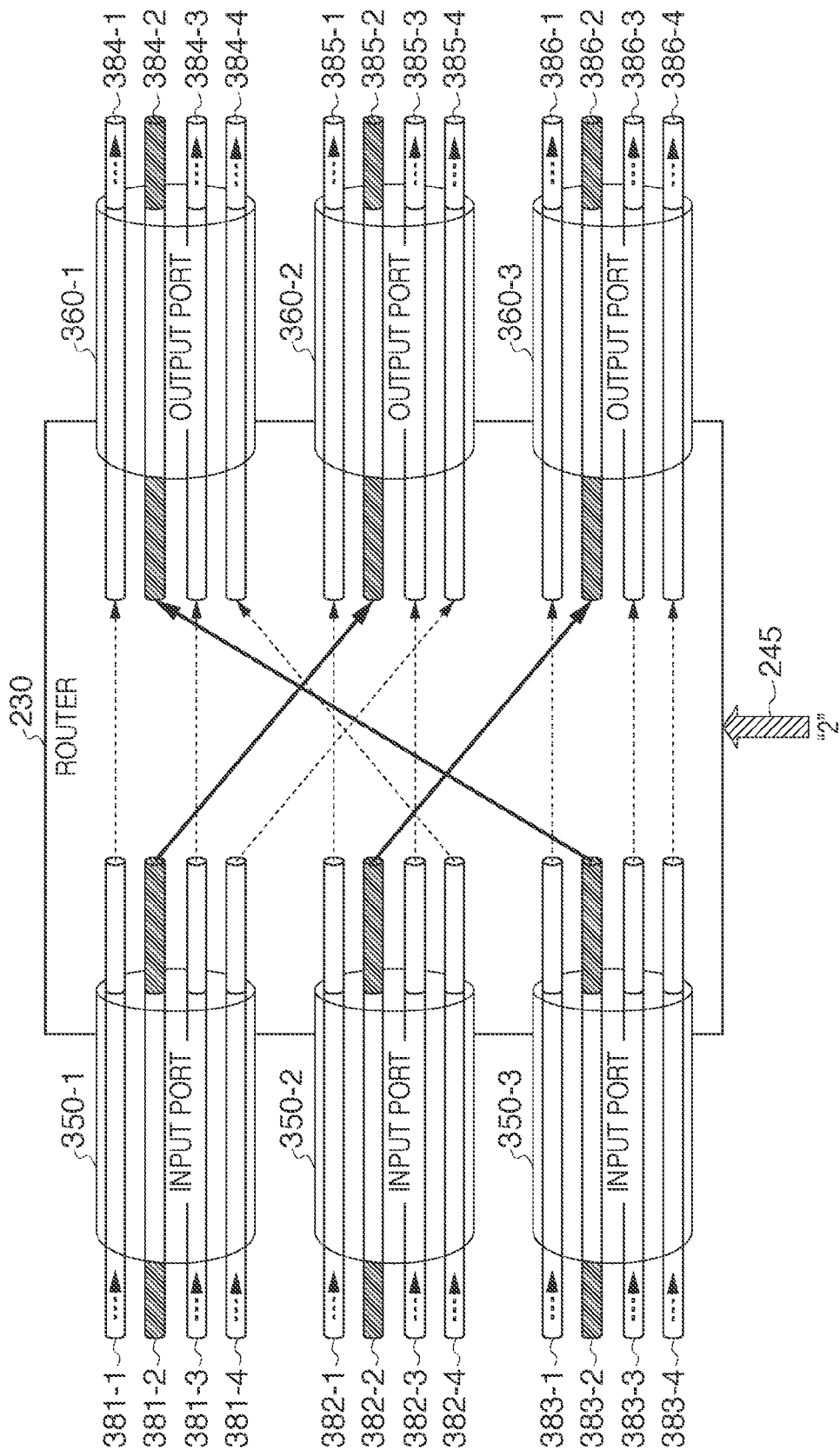
FIG. 5 is a diagram useful in describing router operation.

Control performed by the communication control signal 245 will be described with reference to FIGS. 4 and 5. FIG. 4 illustrates a slot for which the value of communication control signal 245 is "1", and FIG. 5 illustrates a slot for which the value of communication control signal 245 is "2". If only the effective virtual channels in each slot are extracted and considered, the result will be equivalent to FIG. 2. Specifically, this means that the identification number (identification information) of the input port and the input slot can be used to select an output (the value of the communication control signal in the clock cycle in which data has been input). However, if the connection destination of an output port is another router, further routing to this destination is performed by the slot in which the data was output, and therefore it is necessary to suitably select also the slot in which data is output. Accordingly, the output port and output slot (the value of the communication control signal in the clock cycle in which data is output) are selected by the identification number of the input port and the input slot (the value of the communication control signal in the clock cycle in which data has been input). In this way routing according to this embodiment can be implemented. It should be noted that in this embodiment, the input slot of data corresponds to the data input timing, and the output slot corresponds to the data output timing.

It is required that mapping of the virtual channel of an input to the virtual channel of an output be one to one, as in the example illustrated (virtual channels not in use may be freed). For example, if there is a one-to-multipoint connection (a branch), this means that other information is necessary in order to select an output destination. Further, if there is a multipoint-to-one connection (a unification), data is output to the same port simultaneously and, hence, stalling and loss of data occur owing to data collision. Conversely, when a connection is a one-to-one connection, input data is just output to a prescribed virtual channel. Accordingly, information for routing, namely a transmission-destination address, is unnecessary, and it can be assured that collision of data will not occur within the router.

(Structural Elements of Data Processing Apparatus)

An overview of the structural elements shown in FIG. 1 will be described next. An external interface 200 is connected to external modules such as a memory and processor, not shown. The external interface 200 exchanges image processing parameters, control data for setting operating mode, input pixel data and output pixel data with these external modules. In this embodiment, the input pixel data and the output pixel data is assumed to be 24-bit (eight bits per each of R, G, B) data, by way of example.

Network interfaces 220 accommodate discrepancies between the protocols of the IP cores 210 and routers 230 or discrepancies between the protocols of the external interface 200 and routers 230. It should be noted that the network interfaces 220 and routers 230 will be referred to collectively as "network nodes" below.

The signal lines between network nodes are all connected bidirectionally. It is assumed that the bit width of the signal lines is eight bits. If data exceeding eight bits is received and delivered, the data is divided into 8-bit units by the network interface on the transmitting side and is restored by the network interface on the receiving side. Further, the direction of the connection from router 230-1 to router 230-2 and from router 230-2 to router 230-3 (namely the clockwise direction) will be referred to as the forward direction. The direction of the connection from router 230-2 to router 230-1 and from router 230-1 to router 230-8 (namely the counter-clockwise direction) will be referred to as the reverse direction.

The slot controller 240 generates a common communication control signal 245 within the data processing apparatus 100. In this embodiment, the communication control signal 245 is described as taking on any of the values "0", "1", "2", "3" and "4". The communication control signal 245 is input to all of the network nodes simultaneously, and communication between the network nodes is performed in synch with the communication control signal 245. It should be noted that when the value of the communication control signal 245 is "0", all communication is halted temporarily. Thus, in this embodiment, packaging is easy to implement since a common control signal is output to each of the routers 230.

(Routers)

Figure 6:
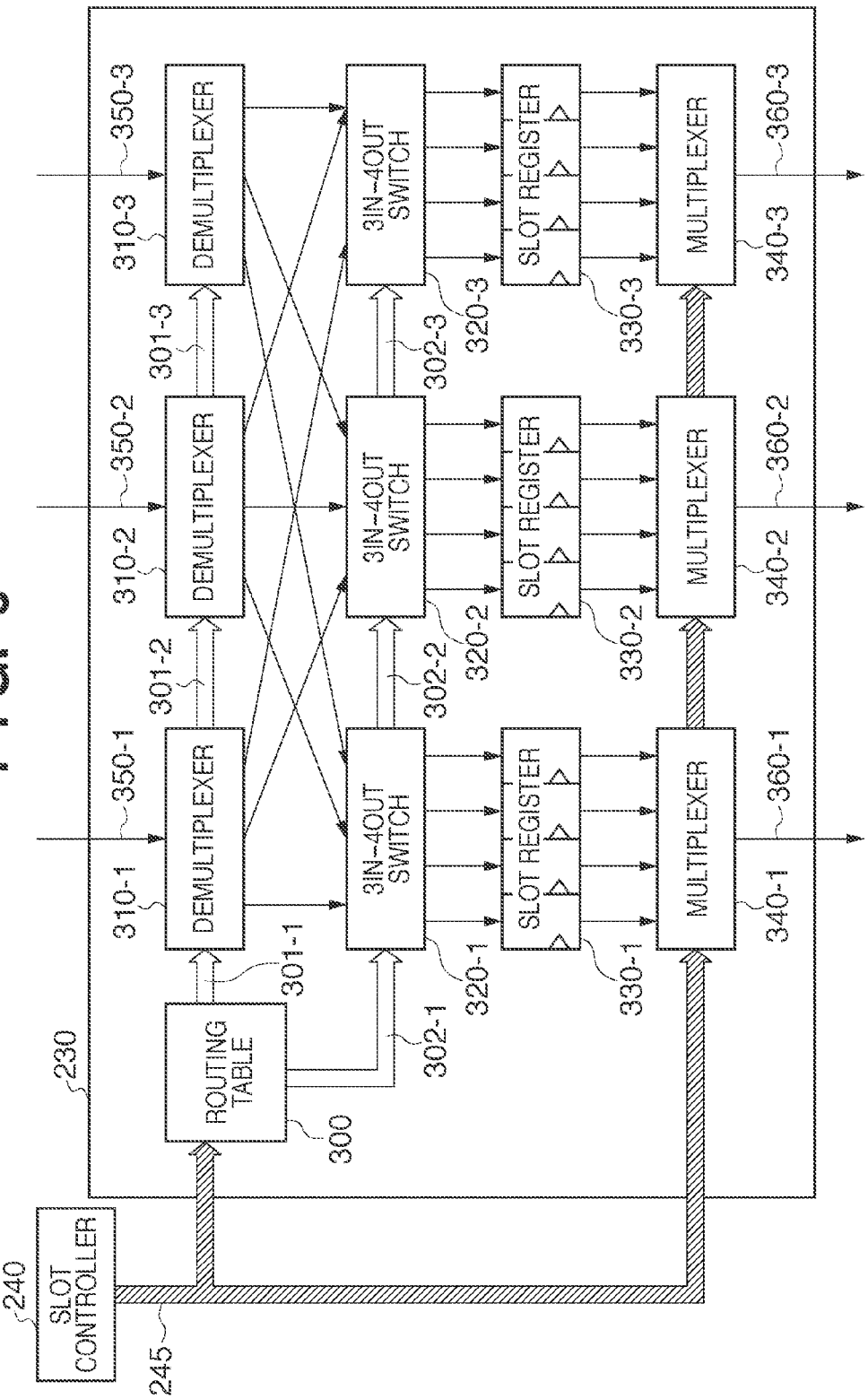
FIG. 6 is a diagram illustrating an example of the configuration of a router.

Next, the elements of the data processing apparatus 100 will be described in further detail. The routers 230 are adapted in such a manner that the data output ports and output slots are capable of being set, prior to the start of processing, for every data input port and input slot in order to relay data transmission among multiple modules. An example of the configuration of the routers 230 is shown in FIG. 6. Illustrated in FIG. 6 are the communication control signal 245, which has been generated by the slot controller 240, a routing table 300 (correspondence information), demultiplexers 310, switches 320, slot registers 330, multiplexers 340, input ports 310 and output ports 360.

Input-port identification numbers (identification information) of input ports 350-1, 2, 3 are assumed to be "1", "2", "3", respectively. Output-port identification numbers (identification information) of outputs ports 360-1, 2, 3 are assumed to be "1", "2", "3", respectively.

The inputs to the routing table 300 are the input-port identification numbers of ports to which data has been input and the input slots (values of the communication control signal 245 in clock cycles in which data has been input). The routing table 300 outputs output-port identification numbers 301 of ports from which data is output and output slots 302 (values of the communication control signal 245 in clock cycles in which data is output). Thus, the routing table 300 pertains to correspondence information indicating the correspondence between input ports and output ports and is stored in a memory device beforehand. In this embodiment, the identification information of input slots is specified as the values of the control signal.

The content of the routing table 300 is set from firmware or the like before the start of processing. If there are multiple entries where combinations of the output-port identification numbers and output slots are the same, then the above-mentioned mapping of virtual channels will be multipoint-to-one mapping. Consequently, it is required that combinations of output-port identification numbers and output slots be exclusive.

Other portions of the router 230 are adapted for outputting input data from appropriate ports at appropriate timings by referring to the routing table 300. On the basis of the output-port identification numbers 301 found by referring to the routing table 300, the demultiplexers 310 determine the switches 320 that will output the input data. For example, input data will be sent to switch 320-1 if output-port identification number 301 is "1", to switch 320-2 if output-port identification number 301 is "2" and to switch 320-3 if output-port identification number 301 is "3".

Each of the switches 320 has three inputs and four outputs, as illustrated in FIG. 6. The inputs are connected to respective ones of the demultiplexers 310, and the outputs are connected to respective registers within the slot registers 330. On the basis of the output slots 302 found by referring to the routing table 300, the switches 320 store the input data in the prescribed registers of the slot registers 330.

Each of the slot registers 330 has registers capable of storing four items of data (a total of 32 bits). The registers correspond to respective ones of cases where the output slots are "1", "2", "3" and "4" and hold the data until the communication control signal 245 indicates these values (that is, until data is selected by the multiplexers 340 and output).

The multiplexers 340 output, to the output ports 360, data that has been stored in those registers of the slot registers 330 that correspond to the slots indicated by the communication control signal 245. In a case where the value of communication control signal 245 is "0", however, the output ports 360 maintain the values of the previous cycle.

The operation of the routers 230 will be described next based upon an example. FIG. 7 illustrates an example of setting of the routing table 300. In FIG. 7, iPort, iSlot, oPort and oSlot indicate input-port identification number, input slot, output-port identification number and output slot, respectively. In this example, data that has been input to input port #1 is routed to output port #2, data that has been input to input port #2 is branched and routed to output ports #1 and #3, and data that has been input to input port #3 is routed to output port #3. The output slot oSlot is changed over by the value of the input slot iSlot, as shown in FIG. 7.

Figure 8:
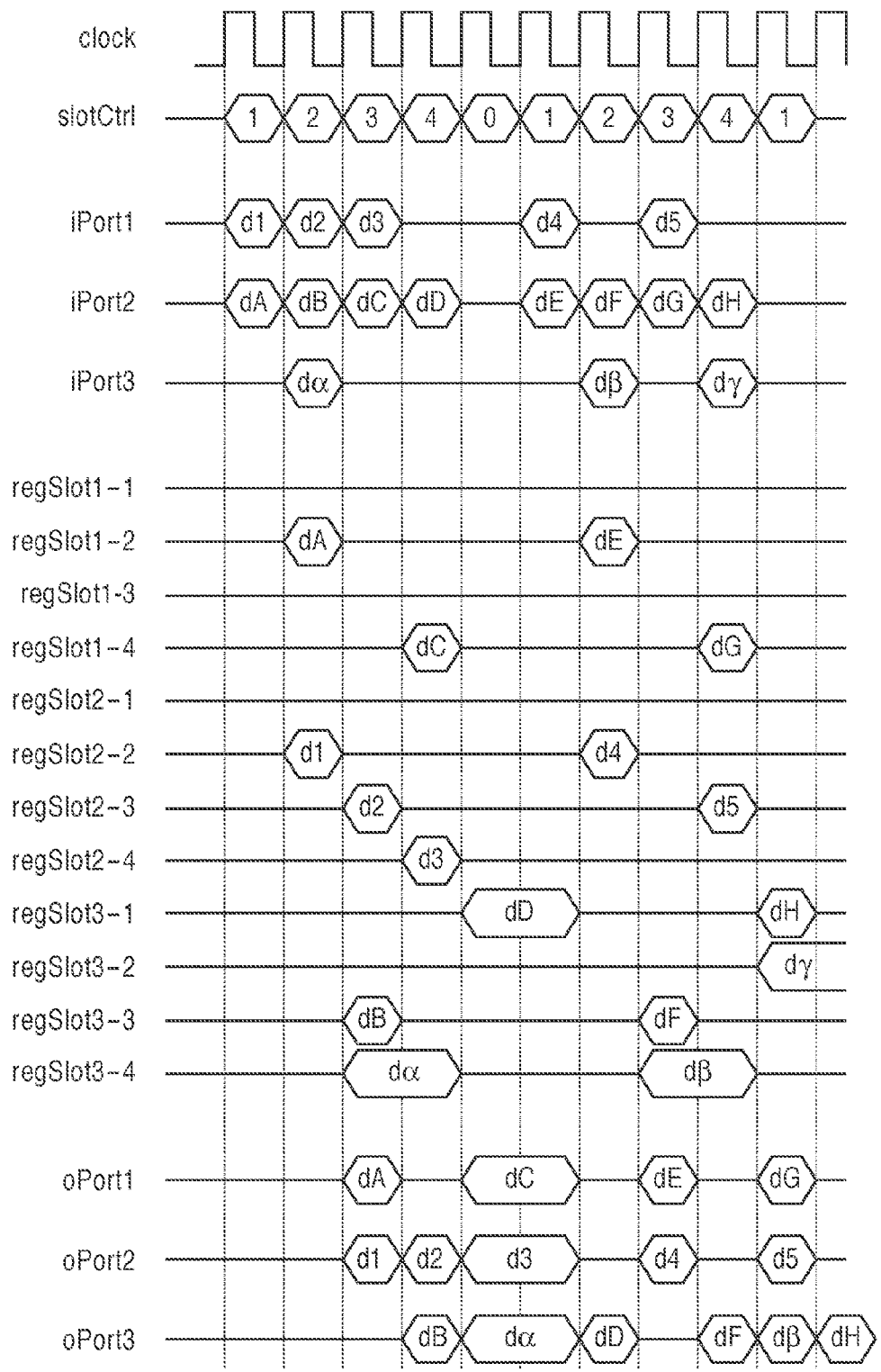
FIG. 8 is a diagram useful in describing an example of router operation.

An example of a timing chart in this case is illustrated in FIG. 8. In FIG. 8, clock, slotCtrl and iPort(N) respectively represent a system clock, the communication control signal 245 indicative of the input slot and an input port for which the input-port identification number is (N). Further, regSlot (N)-(M) represents a register corresponding to a case where the output slot in slot register 330-N is M, and oPort (N) represents an output port for which the output-port identification number is (N). Further, d# (where # is 1, 2, 3, . . . , A, B, C, . . . , α, β, γ, . . . ) is a symbol for distinguishing each item of data.

By way of example, with regard to data d1 that has been input to iPort1, the input-port identification number is "1" and the input slot is "1", and therefore the output-port identification number is found to be 2 and the output slot is found to be 2 by referring to the routing table. Accordingly, the data d1 is sent to the switch 320-2 by the demultiplexer 310-1 and is stored by the switch 320-2 in the register corresponding to a case where the output slot in the slot register 330-2 is "2". This is indicated by regSlot 2-2 in FIG. 8. The data d1 that has been stored in regSlot 2-2 is output to oPort2 by the multiplexer 340-2 in a clock cycle for which the value of slotCtrl is "2".

Further, with regard, for example, to data dB and data dα that have been input simultaneously, the output-port identification number for both of these items of data is "3". However, since the output slots differ, the data dB is stored in regSlot 3-3 and the data dα is stored in regSlot 3-4. Since the multiplexer 340-3 sequentially outputs the values of registers regSlot 3-1, 2, 3, 4 corresponding to the output slots, the items of data are output in the order dB, dα. Thus, even though data is data that is output to the same output port, processing can be executed without contention if different output slots are set.

It should be noted that input data is invalid in a clock cycle in which slotCtrl is "0", as illustrated in FIG. 8. Further, the output data is held until the next cycle.

(Slot Controller)

Figure 9:
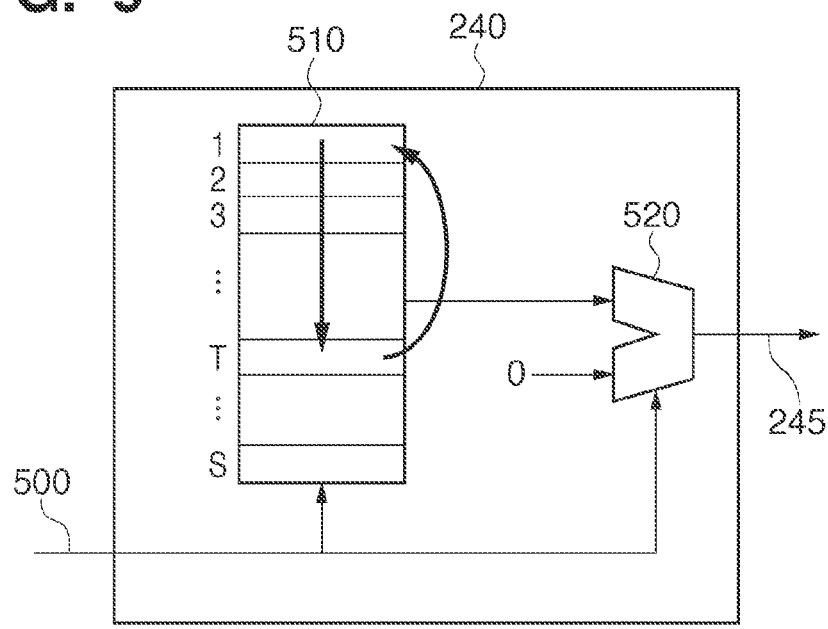
FIG. 9 is a diagram illustrating an example of the configuration of a slot controller.

The slot controller 240 generates the communication control signal 245 and controls all communication among the network nodes. Specifically, the slot controller 240 outputs the control signal to each of the plurality of routers and controls the selection of router path. FIG. 9 illustrates an example of the configuration of the slot controller 240, which includes a slot table 510 and a multiplexer 520 to which a stall signal 500 is applied.

The slot table 510 is a LUT having S-number of entries. When the stall signal 500 is OFF, the value of the LUT pointer is repeatedly incremented from 1 to T ($1 \leq T \leq S$) in conformity with the clock cycle. When the stall signal 500 is ON, the LUT pointer is held at the previous value. Here T represents a value indicating the operating period of the data processing apparatus 100 in clock units. The content of each entry and T are set beforehand by firmware, by way of example.

When the stall signal 500 is OFF, the multiplexer 520 outputs the value of an entry pointed to by the pointer of the LUT. When the stall signal 500 is ON, the multiplexer 520 outputs "0". The stall signal 500 is turned ON when the external interface 200 cannot output data to an external module, by way of example. As a result, all communication within the data processing apparatus 100 can be halted temporarily. In this way a router 230 can be made to stop the relay of a data transmission if the value of the entered control signal is a prescribed value.

At the time of ordinary operation, which is when the stall signal 500 is OFF, the communication control signal 245 is a signal that repeats a prescribed pattern at cycles of period T owing to the operation described above. Accordingly, the frequency with which the value of each slot has been stored in T entries or less determines the throughput of each slot. For example, if T=4 holds and values have been stored in the slot table 510 in the order "1", "2", "3", "4", then the throughput of each of the slots 1 to 4 will be ¼ (byte/cycle). If T=6 holds and values have been stored in the slot table 510 in the order "1", "2", "3", "1", "2", "4", then the throughputs of the slots 1, 2, 3, 4 will be ⅓, ⅓, ⅙, ⅙ (byte/cycle), respectively.

Further, the operation of the router 230 is synchronized to the communication control signal 245, as mentioned above. Owing to the periodicity of the communication control signal 245, therefore, the routers 230 also operate at cycles of period T. As a result, in order to set the routing table 300 and the like in such a manner that all data can be processed without problem in each of the routers 230, only one period of data need be considered. Thus, the slot controller 240 repeatedly outputs, at a prescribed timing, a plurality of preset values in order as the control signal. Accordingly, it is possible for the slot controller 240 to be packaged with ease by a simple arrangement as shown in FIG. 9.

(Network Interfaces)

Figure 10:
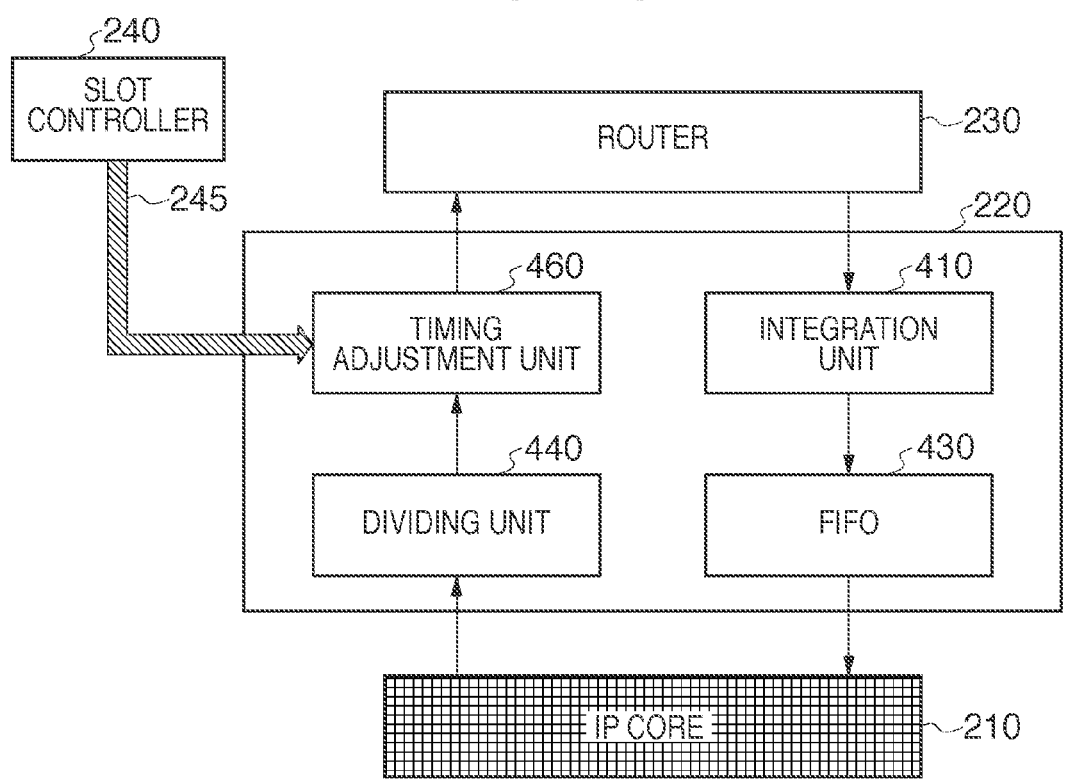
FIG. 10 is a diagram illustrating an example of the configuration of a network interface.

The network interfaces accommodate discrepancies in bit width or throughput between the routers 230 and IP cores 210 and adjust the timing at which data is transmitted to the routers 230. An example of the configuration of network interface 220 is illustrated in FIG. 10. As shown in FIG. 10, the network interface 220 includes an integration unit 410, a FIFO (First In, First Out) buffer 430, a dividing unit 440 and a timing adjustment unit 460.

Data that has been input to the network interface 220 from router 230 is first sent to the integration unit 410. The integration unit 410 accumulates the input data a plurality of times as necessary and consolidates the data in a form in which it is input to the IP core 210. For example, assume that the input to IP core 210 consists of a total of 32 bits, namely 24 bits of pixel data and eight bits of attribute data. These items of data are input from another IP core 210 successively eight bits at a time via the router 230. In this case, the data that has been input from the router 230 is accumulated in the integration unit 410 four times, integrated into the input format and delivered to the FIFO buffer 430.

The FIFO buffer 430 accommodates variations in input throughput to the IP core 210. A variation in input throughput means that the intervals at which data can be input to the IP core 210 vary owing to the internal state of the IP core. In this embodiment, it is arranged so that input throughput to network interface 220 can be handled as being free of variation by averaging variations in input throughput along the time axis.

The dividing unit 440 divides the data that is output by the IP core 210 and converts the data to the data format handled by the router 230. For example, if the data that is output by the IP core 210 is 16 bits, then the dividing unit 440 divides the data into transfer units of eight bits each and sends the data to the timing adjustment unit 460 in two 8-bit streams.

The timing adjustment unit 460 outputs data in a case where the value of the communication control signal 245 matches the output slot set beforehand. If there is no match, then the timing adjustment unit 460 accumulates the data temporarily until a match is achieved. This output slot is set in advance by firmware before processing starts. The router 230, which receives the data from network interface 220, determines the destination of the data depending upon in which slot the data has been input. This means that it is required that the value of this output slot be made to conform to the routing table of the neighboring router 230.

Thus, the FIFO buffer 430 and timing adjustment unit 460 function as throughput buffering unit for accommodating discrepancies in throughput between modules and routers. Further, the integration unit 410 and dividing unit 440 function as bit-width buffering unit for accommodating discrepancies in bit width between modules and routers.

The accommodation of variations in input throughput will be described next. For example, consider a resolution conversion module as the IP core 210. Assume that output throughput is ½ [pixel/cycle] and is constant. Assume that the order of pixel input and pixel output is the raster order and that magnification along both the vertical and horizontal directions is 2×. Since the number of pixels will be four times the number of input pixels in such case, input throughput will be ⅛ [pixel/cycle] on average. With respect to one line of input data, however, a line in which the number of pixels is doubled is output, after which one more line is output. Input throughput, therefore, differs every output line. The FIFO buffer 430 buffers the input data and suppresses the variations in input throughput.

Figure 11:
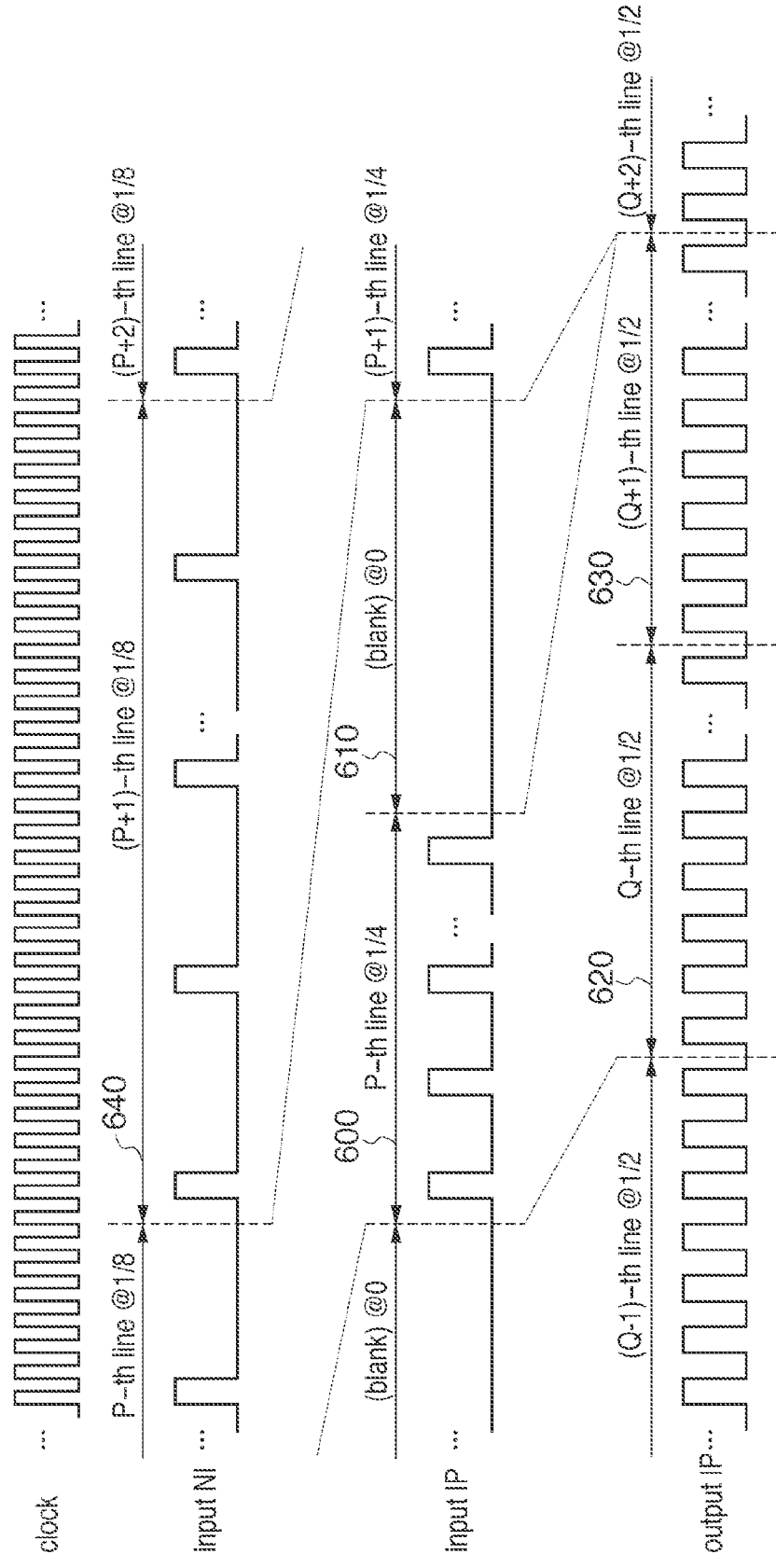
FIG. 11 is a diagram illustrating an example of operation of a network interface.

FIG. 11 illustrates an example of a timing chart illustrating the operation of network interface 220. In FIG. 11, clock, input NI, input IP and output IP represent the system clock, the input from the router 230 to the network interface 220, the input to the IP core 210 and the output from the IP core 210, respectively. FIG. 11 indicates that there is an input or output of data when the value of each signal is high. Further, "Y-th line @Z" indicates that data is the Yth line in an image and that the throughput thereof is Z [pixel/cycle]. In a case where a Qth line (620 in FIG. 11) and (Q+1)th line (630 in FIG. 11) in the output image are output with respect to input of a Pth line (600 in FIG. 11) in the input image, new input data is unnecessary (610 in FIG. 11) when the (Q+1)th line is output. As a consequence, a line for which the throughput is ¼ [pixel/cycle] and a blank interval of the same number of cycles are required alternately as the input to the IP core 210.

In order to accommodate such a variation in input throughput, one line of input is held and delayed by the FIFO buffer 430. That is, when the input to the IP core is the Pth line (600 in FIG. 11), the FIFO buffer 430 buffers the input of the (P+1)th line (640 in FIG. 11). As a result, input NI in which a line for which the throughput is ⅛ [pixel/cycle] continues is converted to input IP in which a line for which the throughput is ¼ [pixel/cycle] and a blank interval are alternately required. This is supplied to the IP core 210. Since input NI has no variation in input throughput, the network interface 220 is a module in which there is no variation in input throughput.

(Example of Operation)

An example of operation of the data processing apparatus 100 will be described next. The input port of input-port identification number "1" and the output port of output-port identification number "1" of router 230 are connected to the neighboring router 230 in the forward direction. Similarly, the input port of input-port identification number "2" and the output port of output-port identification number "2" of router 230 are connected to the neighboring router 230 in the reverse direction. The input port of input-port identification number "3" and the output port of output-port identification number "3" are connected to network interface 220.

As already mentioned, communication among the network nodes within data processing apparatus 100 is performed in synch with the communication control signal 245 generated by the slot controller 240. Accordingly, if the period of each slot exceeds the processing capability of each network node, there is a possibility that this will lead to the problem of partial loss of data. Consequently, it is necessary to set the content of the slot table 510 appropriately by giving consideration to the processing throughput and order of processing of each IP core 210.

Figure 13:
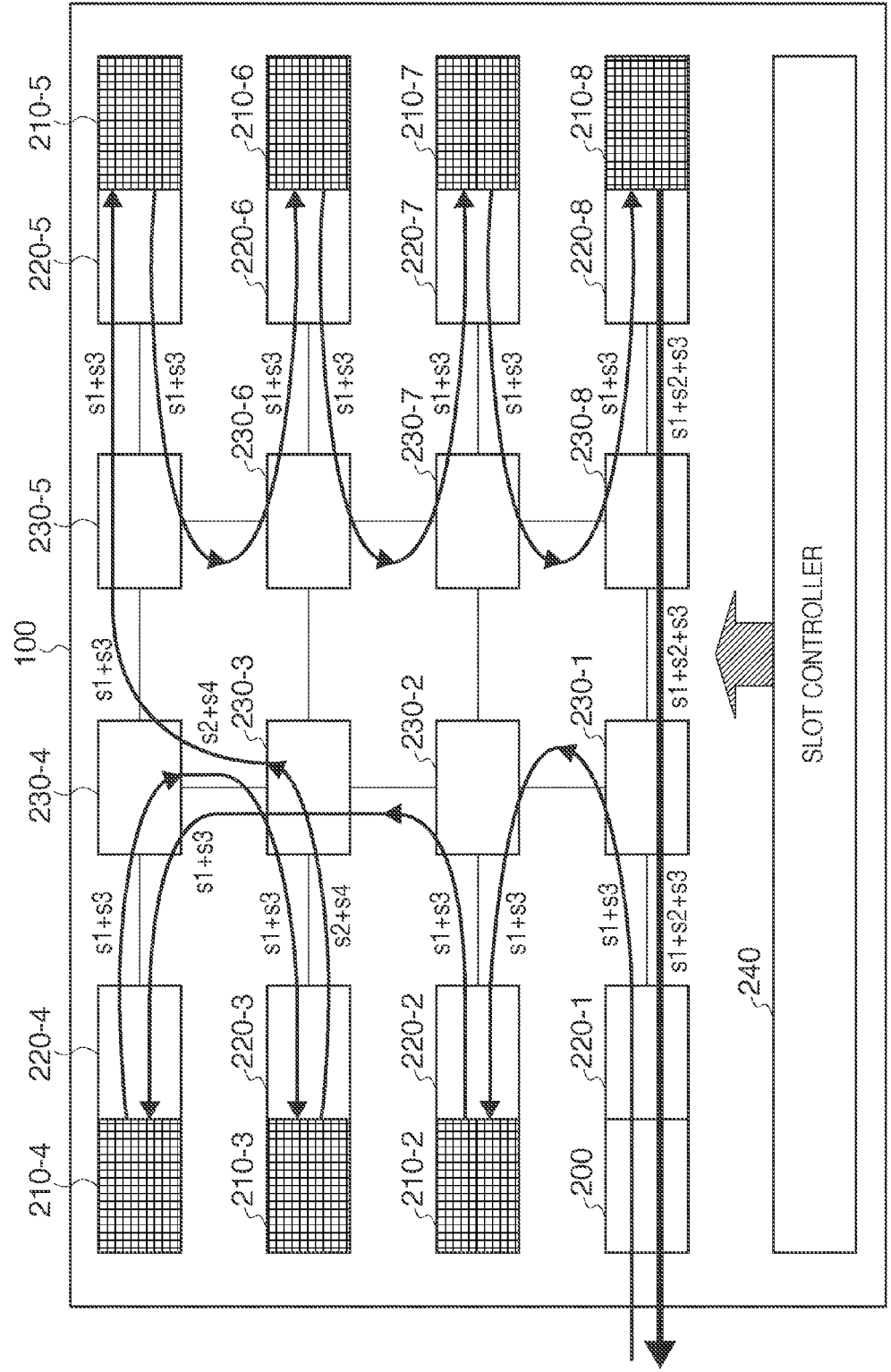
FIG. 13 is a diagram useful in describing an example of operation of an image processing apparatus.

For example, the input throughput, output throughput and processing order of each IP core 210 are as illustrated in FIG. 12. The flow of data in this case is shown in FIG. 13. Assume that data has been input into the data processing apparatus 100 from the external interface 200 at a throughput of ⅙ [pixel/cycle]. In this case, the data is processed by the IP cores 210-2, 210-4, 210-3, 210-5, 210-6, 210-7, 210-8 in the order mentioned. The data is output by the IP core 210-8 at the throughput ¼ [pixel/cycle] and is output to the exterior of the data processing apparatus 100 from external interface 200.

In this case, "1", "2", "3", "4" are set in order as the entries of the slot table 510 in slot controller 240, and the communication control signal 245 is generated as T=4. As a result, when the stall signal 500 is OFF, the communication control signal 245 repeats "1", "2", "3", "4" periodically. That is, each slot is implemented as throughput ¼ [byte/cycle]. Since one pixel consists of 24 bits and one unit of transfer is eight bits, it is required that transfer be performed three times in order to transfer one pixel. That is, the throughput of each slot is 1/12 [pixel/cycle]. Accordingly, by transferring data from the external interface 200 to the IP core 210-8 using two slots, a throughput of ⅙ [pixel/cycle] can be achieved. By transferring data from the IP core 210-8 to the external interface 200 using three slots, a throughput of ¼ [pixel/cycle] can be achieved.

Let the slot when the value of the communication control signal is "1" be referred to as slot 1 (denoted by s1 in FIG. 13), and let the slot when the value of the communication control signal is "2" be referred to as slot 2 (denoted by s2 in FIG. 13). For example, data is transferred using slot 1 and slot 3 over the data path from network interface 220-1 to network interface 220-3. Slot 2 and slot 4 are used over the data path from network interface 220-3 to router 230-3. The reason for this is that slot 1 and slot 3 output in the forward direction in router 230-3 are already being used. Slot 1 and slot 3 are used over the data path from router 230-4 to network interface 220-8. Slot 1, slot 2 and slot 3 are used over the data path from network interface 220-8 to network interface 220-1.

An example of setting of the routing table within router 230 for implementing such routing will be illustrated. In router 230-1, the table is set as shown in FIG. 14A (RT1), by way of example. As a result, with respect to data in slots 1, 2, 3 that have been input in the forward direction (that is, from router 230-8), the data is routed to network interface 220-1 successively using the output slots 1, 2, 3. Further, with respect to data in slots 1, 3 that have been input from the network interface 220-1, the data is output successively in the forward direction using the output slots 1, 3.

In routers 230-2, 5, 6, 7, the table is set as shown in FIG. 14B (RT2), by way of example. As a result, with respect to data in slots 1, 3 that have been input in the forward direction, the data is routed to network interfaces 220-2, 5, 6, 7 successively using the output slots 1, 3. Further, with respect to data in slots 1, 3 that have been input from the network interfaces 220-2, 5, 6, 7 the data is output successively in the forward direction using the output slots 1, 3.

In router 230-3, the table is set as shown in FIG. 14C (RT3), by way of example. As a result, with respect to data in slots 1, 3 that have been input in the forward direction (namely from router 230-2), the data is output in the forward direction (namely to router 230-4) successively. Further, with respect to data in slots 1, 3 that have been input in the reverse direction (namely from router 230-4), the data is routed to the network interface 220-3 successively using the output slots 1, 3. Further, with respect to data in slots 2, 4 that have been input from network interface 220-3, the data is output successively in the forward direction (namely to router 230-4) using the output slots 2, 4.

In router 230-4, the table is set as shown in FIG. 14D (RT4), by way of example. As a result, with respect to data in slots 1, 3 that have been input in the forward direction (namely from router 230-3), the data is routed to network interface 220-4 successively using the output slots 1, 3. Further, with respect to data in slots 2, 4 that have been input in the forward direction (namely from router 230-3), the data is output in the forward direction (namely from network interface 220-4) successively using the output slots 1, 3. Further, with respect to data in slots 1, 3 that have been input from network interface 220-4, the data is output in the reverse direction (namely to router 230-3) successively using the output slots 1, 3.

In router 230-8, the table is set as shown in FIG. 14E (RT5), by way of example. As a result, with respect to data in slots 1, 3 that have been input in the forward direction (namely from router 230-7), the data is routed to network interface 220-8 successively using the output slots 1, 3. Further, with respect to data in slots 1, 2, 3 that have been input from network interface 220-8, the data is output in the forward direction (namely to router 230-1) successively using the output slots 1, 2, 3. As a result of the foregoing, the required specifications illustrated in FIG. 12 can be met.

In this embodiment, as described above, each of the routers 230 utilizes values of the entered control signal to determine the output port and output timing used in data transmission. As a result, it is not necessary to add information to the transmission data for the purpose of controlling routing, and efficient data transmission becomes possible.

Further, each router 230 determines the output port and output timing used in data transmission by referring to the routing table 300. As a result, the arrangement is not complicated and packaging is easy to implement.

In this embodiment, as described above, communication among the network nodes is performed in synch with the communication control signal generated by the slot controller. As a result, data communication can be implemented without adding information to communication data for the purpose of routing. Accordingly, it is possible to provide a data communication technique of reduced overhead.

In this embodiment, communication is halted temporarily in a case where the value of the communication control signal 245 is "0" and proceeds normally in the case of other values. However, a slot for a specific use may also exist. For example, a slot for setting a parameter of the IP core 210 may exist. Further, in this embodiment, the communication control signal 245 takes on five values, namely "0", "1", "2", "3" and "4". However, implementation can be achieved with any number of values. The values of the communication control signal 245 may be expressed by one-hot codes.

Furthermore, the IP core 210 may use the value of the communication control signal as a parameter at the time of data processing. For example, filter coefficients may be changed over in accordance with the slot by an IP core that performs a filtering operation.

Although the input is assumed to be image data and image processing is executed by the IP core 210, processing of any content can be implemented. For example, the content may be voice data, document data or application programs and the like.

Further, although only an input-port identification number and an input slot are used in routing in router 230, other information may be used conjointly. For example, information that accompanies data may be referred to in addition to the input-port identification number and input slot.

Further, the network interface 220 is not limited to the arrangement described above. For example, if the input throughput of IP core 210 is free of variations, then the FIFO buffer 430 may be eliminated. If the bit width of IP core 210 is less than the bit width of router 230, then the integration unit 410 and dividing unit 440 may be eliminated.

Figure 15:
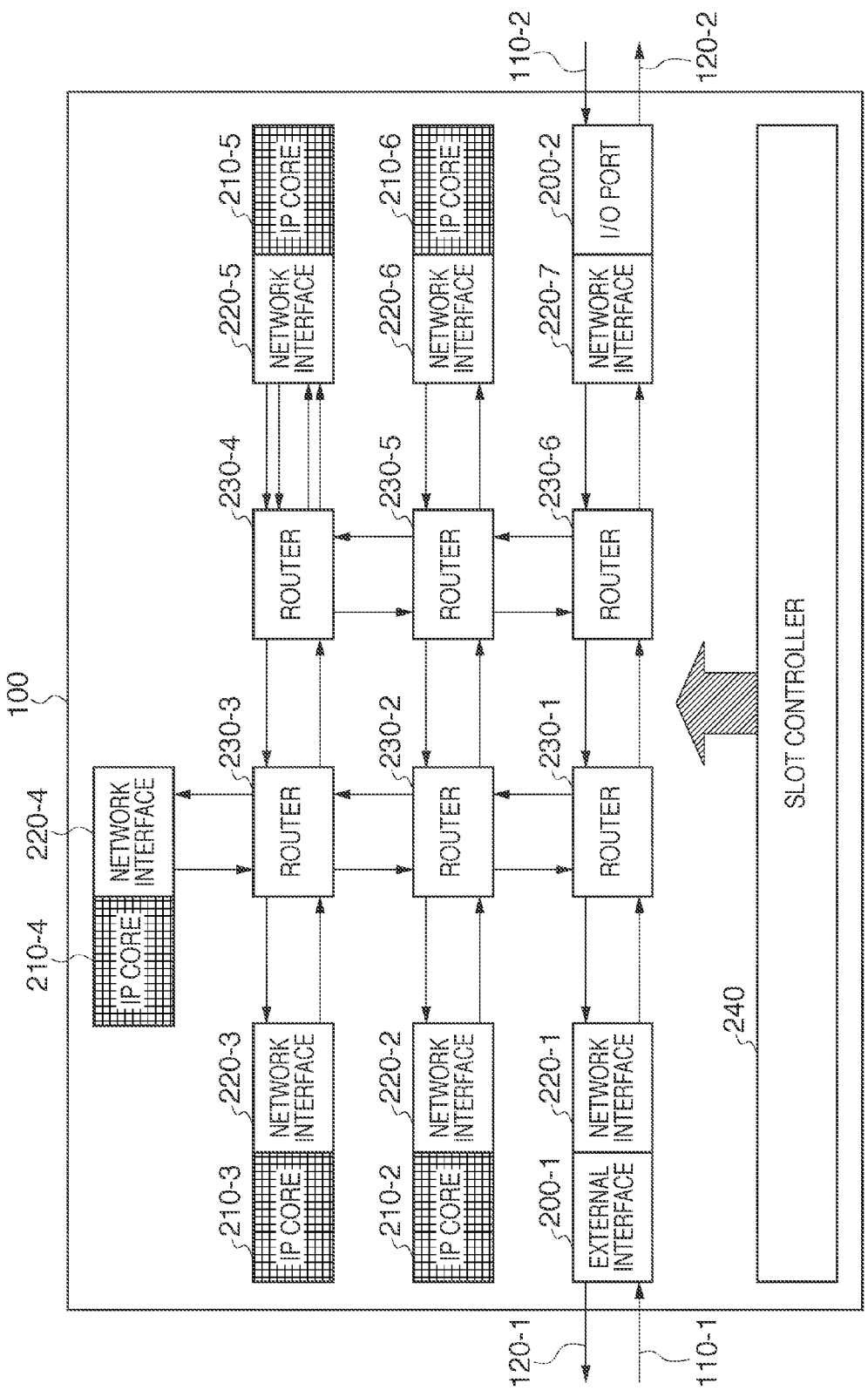
FIG. 15 is a diagram illustrating an example of the configuration of an image processing apparatus.

Although eight routers are connected in the form of a ring in the foregoing arrangement, this does not impose a limitation upon the invention. A topology of the kind shown in FIG. 15 will be described next. In FIG. 15, routers 230-2, 3, 4, 5 have four inputs and four outputs but the construction of each is similar to that described above. The routers in FIG. 15 have the following components in a case where the number of slots is A, the number of input ports is B and the number of output ports is C:

a routing table in which the number of entries is (A×B);
B-number of demultiplexers each having C-number of outputs;
C-number of switches each having B-number of inputs and C-number of outputs;
C-number of slot registers in which A-number of items of data can be stored; and
C-number of multiplexers each having A-number of inputs.

Figure 16:
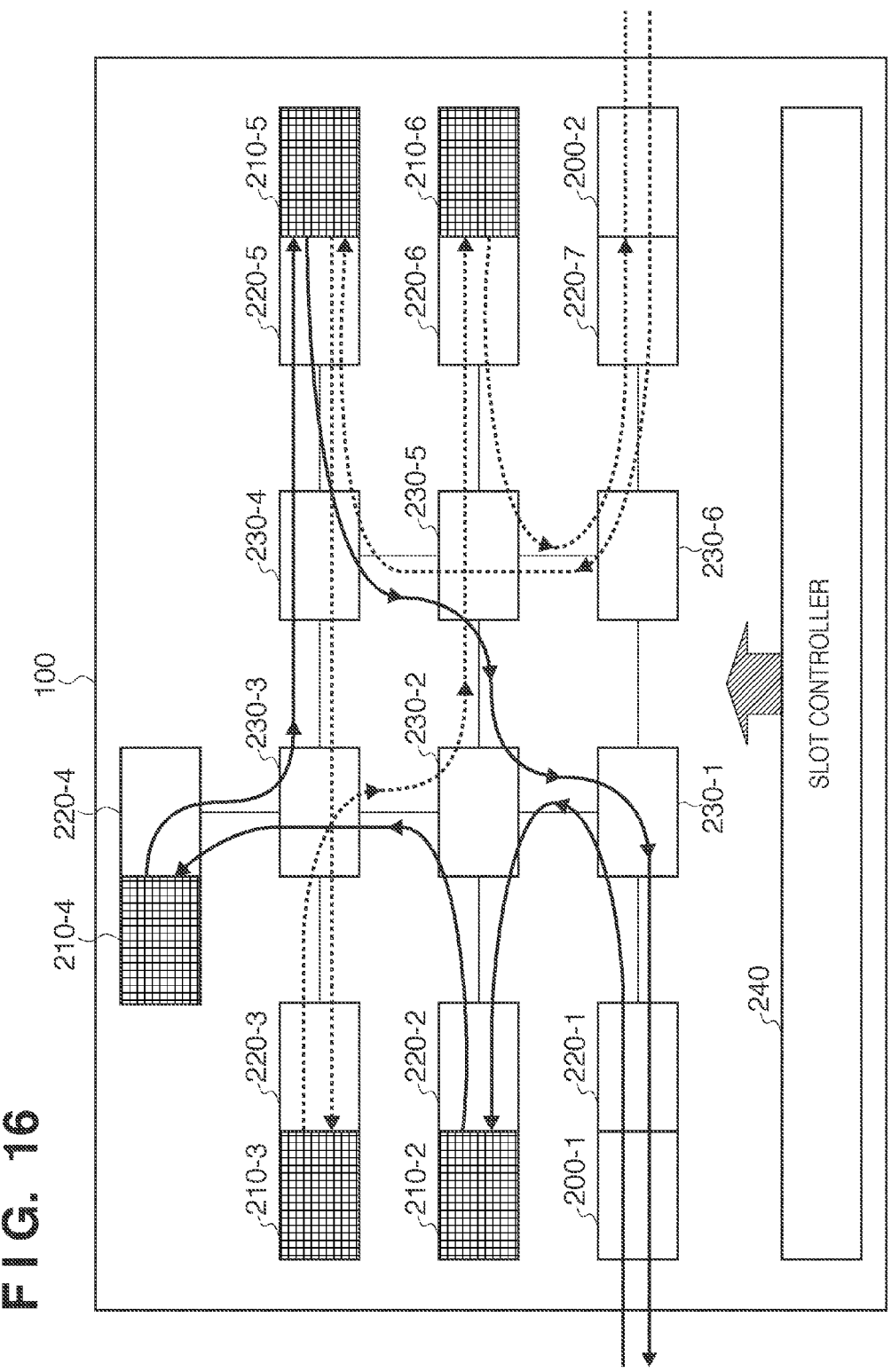
FIG. 16 is a diagram useful in describing an example of operation of an image processing apparatus.

FIG. 16 illustrates an example of operation in this arrangement. Thus, even though different data sequences are input simultaneously from two external interfaces, the data can be processed without problem as long as the combinations of output-port numbers and output slots in the routing table of each router 230 are exclusive. Thus, since the arrangement of FIG. 15 does not limit the topology, the arrangement can be changed easily in accordance with the application.

Figure 17:
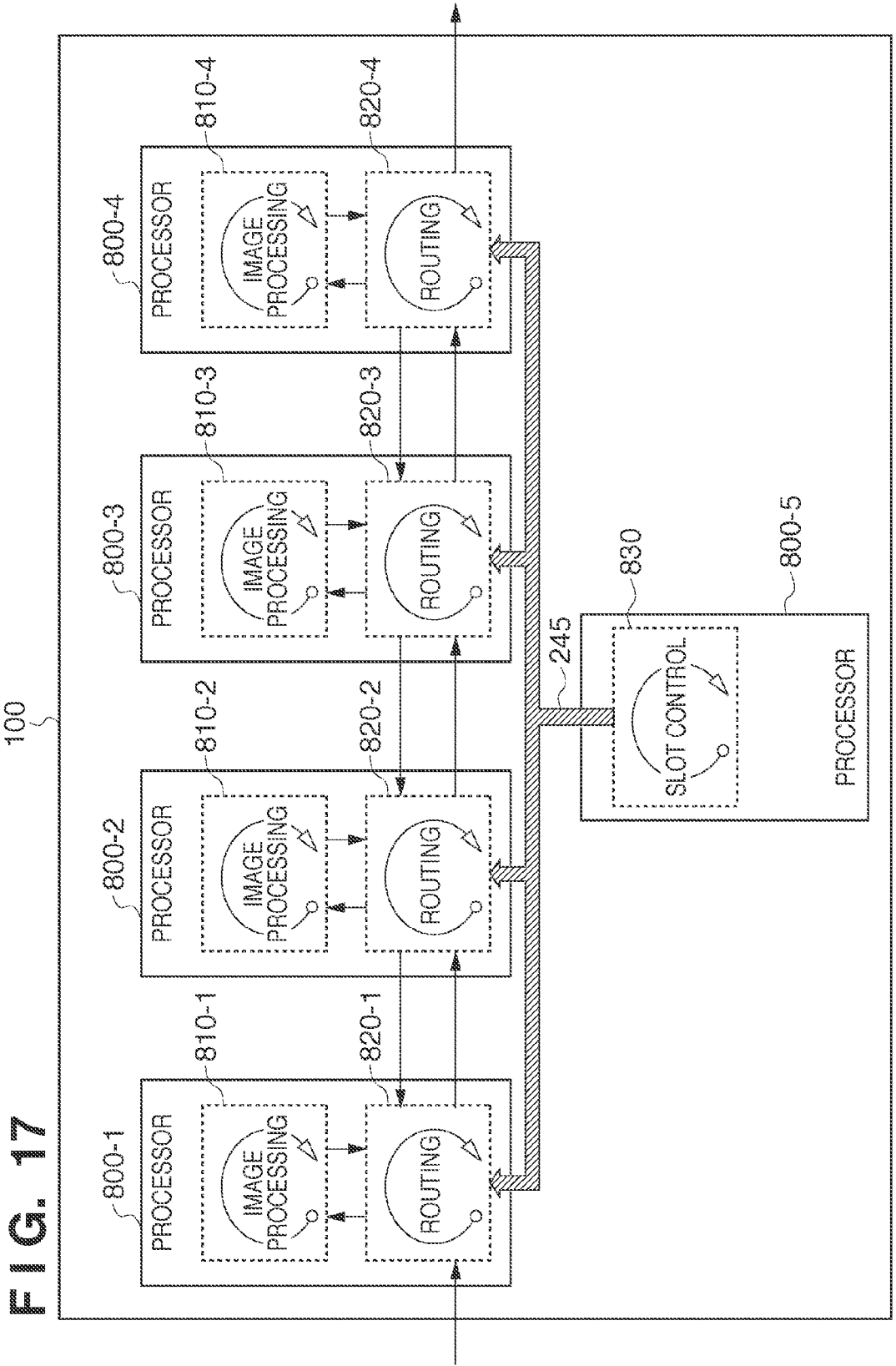
FIG. 17 is a diagram illustrating an example of the configuration of an image processing apparatus.

The foregoing description deals with data communication between IP cores. An arrangement regarding a multichip processor system will be described next. An example of the arrangement is shown in FIG. 17. The arrangement of FIG. 17 includes processors 800. The processors 800 need not all be the same.

A slot control process 830 is a function for generating the communication control signal 245 applied to the processors 800. Image processing processes 810 are functions for executing various image processing in the processors 800. Routing processes 820 are functions for communicating data with neighboring processors in the processors 800. The data output ports and data output timing are determined by the value of communication control signal 245 at the timing at which data is received and the input-port identification number assigned to the port to which the communication data has been input. The ports referred to here may be ports packaged as hardware or ports packaged as software. Data communication can be implemented by the arrangement set forth above.

Communication overhead can be reduced in a multiprocessor system as well, as described above. It should be noted that the arrangement set forth in the foregoing embodiment of the multiprocessor arrangement is not the only arrangement. For example, the slot control process 830 and the image processing process 810 may operate in the same processor. A plurality of the slot control processes 830 may operate in parallel in a plurality of processors and a mechanism for synchronizing these may be provided.

In the above-described arrangement, the slot controller generates the communication control signal and distributes the signal to each of the network nodes. This makes it necessary to wire the communication control signal in radiating fashion with the slot controller at the center. Consequently, if the number of network nodes is large, there is the possibility that wiring will be complicated. In this embodiment, each network node self-generates the communication control signal.

The communication control signal usually is periodic. If the network nodes are synchronized (if the values of the communication control signal are the same), functions equivalent to those of the above-described arrangement can be implemented. However, the stall signal used in a case where communication is halted (namely in a case where the value of the communication control signal is 0) is relayed between the network nodes. In this way it is arranged so that the stall timing can also be synchronized.

Figure 18:
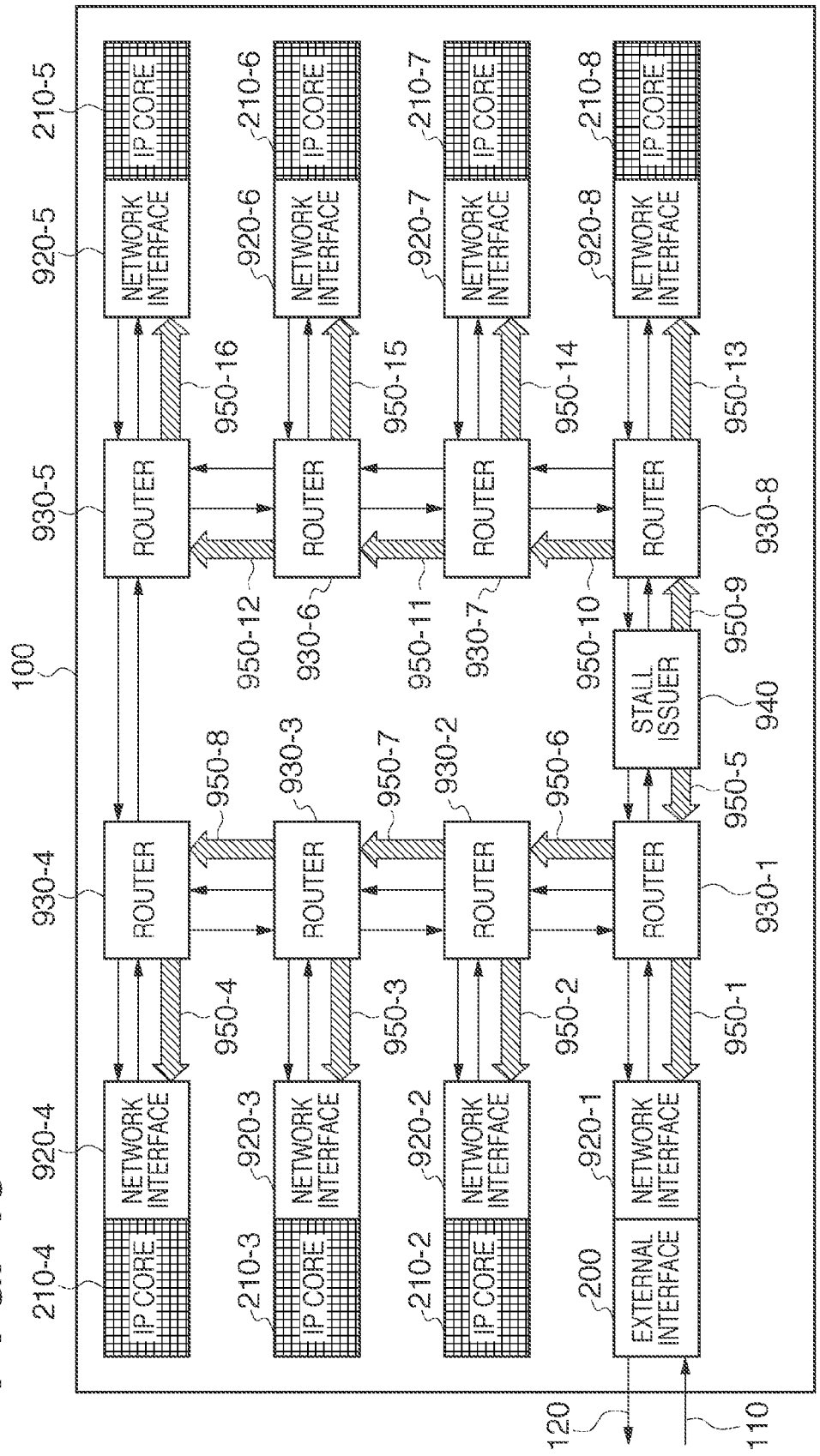
FIG. 18 is a diagram illustrating an example of the configuration of an image processing apparatus.

An example of the arrangement is shown in FIG. 18. As illustrated in FIG. 18, a stall issuer 940 is connected as one node between ring-connected routers. The arrows in the form of vertical stripes in FIG. 18 indicate the propagation of a stall signal 950. The stall signal is relayed from the stall issuer 940 in order one node at a time in one cycle. That is, in the case of FIG. 18, it takes five cycles for the signal to reach the farthest network interfaces 920-4 and 920-5.

Since it is necessary for stall to be synchronized between network nodes, all communication is halted temporarily five cycles after the stall issuer 940 issues the stall signal. For example, router 930-1 halts communication temporarily five cycles after it receives the stall signal. Router 930-3 halts communication temporarily three cycles after it receives the stall signal. Network interface 920-4 receives the stall signal and then halts communication temporarily in the next cycle. Thus, stall can be made to occur at the same timing.

Figure 19:
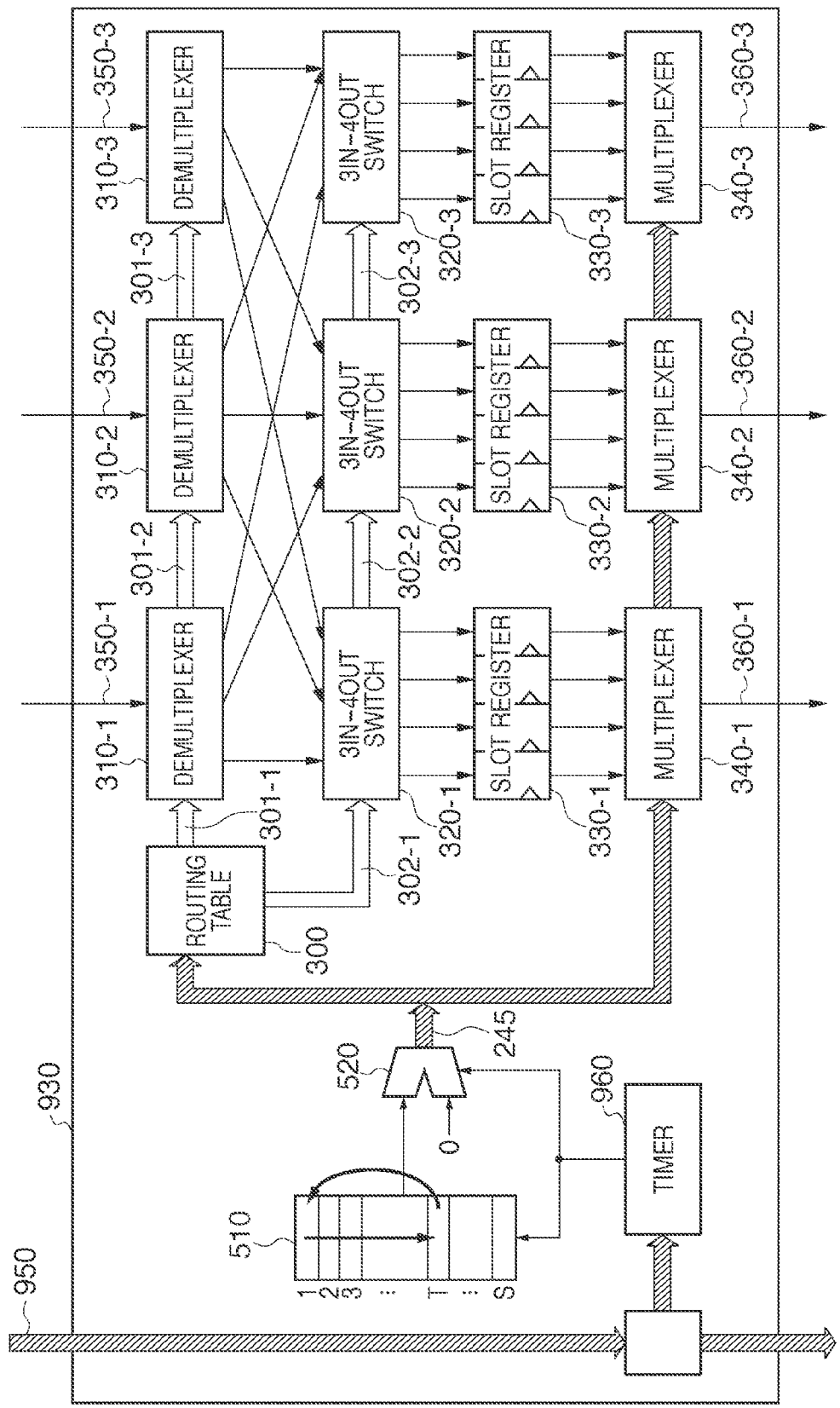
FIG. 19 is a diagram illustrating an example of the configuration of a router.

FIG. 19 illustrates an example of router configuration. As illustrated in FIG. 19, in this case the network node includes the function of the slot controller shown in FIG. 9. The communication control signal 245 thus is generated internally. The stall signal 950 is input to a timer 960 and is held there for a prescribed number of cycles. The number of cycles differs depending upon the distance to the stall issuer 940, as mentioned earlier. The same holds true for the network interfaces. As a result, the values of the communication control signals generated between network nodes are the same and control similar to that described above is possible.

Thus, as described above, the communication control signal can be generated within each network node. In this case, a mechanism for synchronizing stall becomes necessary.

Although each network node is a unit that generates a communication control signal, this capability may be shared by several network nodes. (If this capability is shared by all of the network nodes, the resulting arrangement will be similar to that described above.) A plurality of the stall issuers may be provided.

In accordance with each of the arrangements described above, the routers perform routing by referring to the value of the communication control signal. Since this enables a reduction in the amount of information added onto communication data, it is possible to improve data communication efficiency. For example, assume that the bandwidth of data communication between routers is 32 [bit/cycle]. In the case of the conventional method described earlier, the communication data that can be transferred in one cycle is a maximum of 16 bits if the information added onto the communication data is 16 bits. On the other hand, in accordance with the present invention, communication data that can be transferred in one cycle is a maximum of 32 bits.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-291398, filed on Dec. 22, 2009, and Japanese Patent Application No. 2010-264296, filed Nov. 26, 2010, which are hereby incorporated by reference herein in their entirety.

What is claimed is:

1. A data processing apparatus comprising:
a plurality of modules each configured to execute data processing based on input data;
a control unit configured to output a control signal at a timing for transferring the input data; and
a plurality of routers, each having a plurality of input ports and a plurality of output ports, a plurality of demultiplexers, and a storage unit configured to store correspondence information indicative of a corresponding relationship among identification information of the input ports, a value of a control signal of an input timing to the input ports, identification information of the output ports, and a value of a control signal of an output timing to the output ports, said plurality of demultiplexers being configured to relay data transmission among said plurality of modules,
wherein each of said plurality of demultiplexers associates one of said plurality of input ports with one of said plurality of output ports based on correspondence information corresponding to the control signal delivered at the input timing to one of the input ports of a router of said plurality of routers from said control unit,
wherein the control signal is delivered to said router from said control unit separately from data to be transferred by said router, and
wherein said router outputs input data to the associated output port in a case where the value of the control signal output by said control unit is the value of the control signal of the output timing to the output port represented in the correspondence information.

2. The apparatus according to claim 1, wherein each of said plurality of routers further comprises a deciding unit configured to (a) determine at least one association between the input port and the output port for data transmission based on identification information of an input port to which the input data has been input, and (b) control the plurality of demultiplexers based on the determined association.

3. The apparatus according to claim 2, wherein said deciding unit refers to the correspondence information to determine the output port for data transmission.

4. The apparatus according to claim 1, wherein said control unit repeatedly outputs a preset plurality of values in order at a prescribed timing as the control signal.

5. The apparatus according to claim 1, further comprising a throughput buffering unit configured to accommodate discrepancies in throughput between said modules and said routers.

6. The apparatus according to claim 1, further comprising a bit-width buffering unit configured to accommodate discrepancies in bit width between said modules and said routers.

7. The apparatus according to claim 1, wherein said control unit outputs, as the control signal, a plurality of consecutive integer values in increasing order at equal intervals.

8. The apparatus according to claim 1, wherein said router halts relay of data transmission in a case where a value of the control signal that has been input thereto is prescribed value.

9. The apparatus according to claim 1, wherein said control unit outputs, as the control signal, periodically-patterned preset values.

10. The apparatus according to claim 1, wherein each of said plurality of routers comprises a register for each output port, and
wherein the register holds output data corresponding to the value of the control signal of the output timing to the output port.

11. A method of controlling a data processing apparatus, said method comprising:
executing data processing based on input data, by a plurality of modules;
outputting a control signal at a timing for transferring the input data, by a control unit; and
relaying data transmission among said plurality of modules, by a plurality of routers, each having a plurality of input ports and a plurality of output ports, a plurality of demultiplexers, and a storage unit configured to store correspondence information indicative of a corresponding relationship among identification information of the input ports, a value of a control signal of an input timing to the input ports, identification information of the output ports, and a value of a control signal of an output timing to the output ports,
wherein each of the plurality of demultiplexers associates one of the plurality of input ports with one of the plurality of output ports based on the correspondence information corresponding to the control signal delivered at the input timing to one of the input ports of a router of the plurality of routers from the control unit, wherein the control signal is delivered to the router from the control unit separately from data to be transferred by the router, and wherein the router outputs input data to the associated output port in a case where the value of the control signal output in the outputting step is the value of the control signal of the output timing to the output port represented in the correspondence information.

12. A data processing apparatus comprising:

a plurality of modules each configured to execute data processing based on input data;

a control unit configured to output a control signal for transferring the input data; and a plurality of routers, each having a plurality of switches and a plurality of output ports, a plurality of registers, and a storage unit configured to store correspondence information indicative of a corresponding relationship among identification information of input ports, a value of a control signal of an input timing to the input ports, identification information of the output ports, and a value of a control signal of an output timing to the output ports, the plurality of registers being configured to relay data transmission among said plurality of modules via a plurality of virtual channels, wherein each of the plurality of switches inputs the input data to one of the plurality of registers based on correspondence information corresponding to the control signal delivered at the input timing to an input port of a router of said plurality of routers from said control unit, wherein the control signal is delivered to said router from said control unit separately from data to be transferred by said router, and wherein the router outputs input data to the associated output port in a case where the value of the control signal output by the control unit is the value of the control signal of the output timing to the output port represented in the correspondence information.

13. The apparatus according to claim 12, wherein the plurality of registers output the data to the output port via multiplexers.

14. A method of controlling a data processing apparatus, said method comprising:

executing data processing based on input data, by a plurality of modules;

outputting a control signal at a timing for transferring the input data, by a control unit; and relaying data transmission among the plurality of modules via a plurality of virtual channels, by a plurality of routers, each having a plurality of switches and a plurality of output ports, a plurality of registers, and a storage unit configured to store correspondence information indicative of a corresponding relationship among identification information of input ports, a value of a control signal of an input timing to the input ports, identification information of the output ports, and a value of a control signal of an output timing to the output ports, wherein each of the plurality of switches inputs the input data to one of the plurality of registers based on correspondence information corresponding to the control signal delivered at the input timing to an input port of a router of the plurality of routers from the control unit, wherein the control signal is delivered to the router from the control unit separately from data to be transferred by the router, and wherein the router outputs input data to the associated output port in a case where the value of the control signal output in the outputting step is the value of the control signal of the output timing to the output port represented in the correspondence information.

* * * * *